(12) United States Patent
Ishino

(10) Patent No.: US 7,029,122 B2
(45) Date of Patent: Apr. 18, 2006

(54) PROJECTOR

(75) Inventor: Hirohisa Ishino, Kanagawa (JP)

(73) Assignee: Sony Corporation, Tokyo (JP)

( * ) Notice: Subject to any disclaimer, the term of this patent is extended or adjusted under 35 U.S.C. 154(b) by 89 days.

(21) Appl. No.: 10/488,366

(22) PCT Filed: Jul. 23, 2003

(86) PCT No.: PCT/JP03/09341

§ 371 (c)(1),
(2), (4) Date: Mar. 2, 2004

(87) PCT Pub. No.: WO2004/012006

PCT Pub. Date: Feb. 5, 2004

(65) Prior Publication Data

US 2005/0001984 A1   Jan. 6, 2005

(30) Foreign Application Priority Data

Jul. 26, 2002   (JP) ............... 2002-218733

(51) Int. Cl.
G03B 21/00 (2006.01)
G03B 21/26 (2006.01)
G03B 21/16 (2006.01)
G02F 1/1335 (2006.01)
H04N 5/74 (2006.01)

(52) U.S. Cl. .................. 353/31; 353/33; 353/34; 353/37; 353/60; 353/81; 353/82; 353/84; 349/8; 348/748; 348/750; 348/757

(58) Field of Classification Search ............... 353/33, 353/30, 31, 34, 37, 81, 82, 84, 52, 57, 60, 353/119, 122; 349/5, 7–9; 348/739, 744, 348/748, 750, 757, 758, 918
See application file for complete search history.

(56) References Cited

U.S. PATENT DOCUMENTS

| 6,375,330 B1 * | 4/2002 | Mihalakis ............... 353/31 |
| 6,471,357 B1 * | 10/2002 | Hara et al. ............. 353/57 |
| 6,623,129 B1 * | 9/2003 | Fujimori ............... 353/122 |
| 6,783,242 B1 * | 8/2004 | Hirata et al. ............ 353/20 |
| 2002/0085178 A1 * | 7/2002 | Mihara .................. 353/52 |

FOREIGN PATENT DOCUMENTS

EP    106552 A2 *  1/2001

* cited by examiner

Primary Examiner—W. B. Perkey
Assistant Examiner—Rochelle Blackman
(74) Attorney, Agent, or Firm—Jay H. Maioli

(57) ABSTRACT

A projector for projecting an image to an external screen in which an optical unit, includes rectangular liquid crystal panels disposed such that the short sides thereof are substantially parallel with a plane including principal light beams of the respective color light beams to be composited by a prism. Transmission cables are drawn out from the short sides of the respective liquid crystal panels, and a cooling fan is disposed such that the direction of cooling air is approximately parallel with the long sides of the liquid crystal panels.

5 Claims, 9 Drawing Sheets

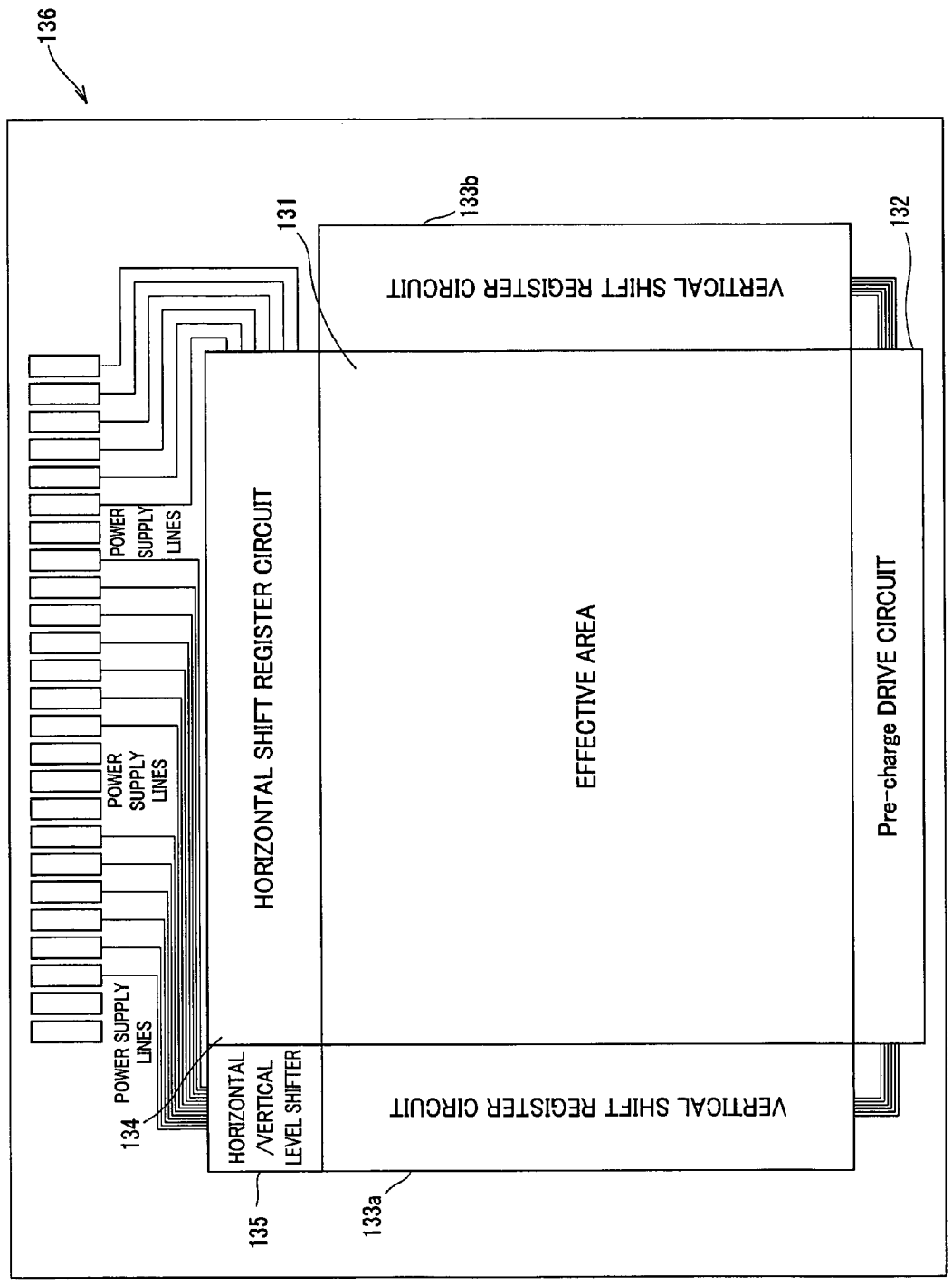

PROJECTOR

TECHNICAL FIELD

The present invention relates to a projector which can project an image to an external screen, etc.

The application claims priority of Japanese Patent Application No. 2002-218733, filed on Jul. 26, 2002, the entirety of which is incorporated by reference herein.

BACKGROUND ART

Up to now, as the configuration of an internal optical system of a color liquid crystal projector, there are employed the horizontal type unit and the vertical type unit. Each of a projector 200a being of the horizontal type shown in FIG. 1A and a projector 200b being of the vertical type shown in FIG. 1B color-separates white light emitted from a light source, not shown, into three primary colors of red, green and blue using a dichroic mirror 201, and modulates thus color-separated lights in accordance with image signals using three liquid crystal panels, and color-composites thus modulated lights, and extendedly projects thus composited light to a screen using a projection lens 202 to display an image.

Here, when the size of an image to be projected I is H×V, being subject to the disposition of a dichroic mirror 201 shown in FIGS. 1A and 1B, the horizontal type projector 200a has the depth and width of its housing determined depending on the horizontal dimension H of the image to be projected I, and the vertical type projector 200b has the depth and height of its housing determined depending on the vertical dimension V. Since the horizontal length is longer than the vertical length as for a liquid crystal panel, the horizontal type projector 200a has a larger optical system for separating/compositing white light emitted from a light source as compared with the vertical type projector 200b, which undesirably leads to cost increase. In particular, in the case of using a liquid crystal panel with the aspect ratio of 16:9, etc. (a wide panel), which is suitable for video image projection, even though the length of the diagonal line is equal to that of a liquid crystal panel with the aspect ratio of 4:3 which is suitable for data projection, the length of long side direction becomes longer, thereby the problem described above becomes further noticeable.

Meanwhile, as for a projector unit, it is important to make the size smaller and also to satisfy variation of dispositions such as hanging a projector from a ceiling, placing a projector on a floor, etc. In case a vertical type optical system is employed to make the unit size smaller, the size along the height direction becomes large, which makes it difficult to hang a projector from ceiling. Conversely, in case a horizontal type optical system is employed, even though variation of dispositions is increased, when a liquid crystal panel of the same size is used, the unit size becomes larger as compared with the case employing a vertical type optical system. This problem is particularly noticeable when employing a crystal liquid panel with the aspect ratio of 16:9, etc. (a wide panel) as described above.

Thus, since both conventional projectors of the vertical type and of the horizontal type respectively have advantage and disadvantages, it is not satisfactorily convenient to employ any types of unit.

DISCLOSURE OF THE INVENTION

Accordingly, the present invention has an object to overcome the above-mentioned drawbacks of the prior art by providing a new projector.

Furthermore, the present invention has another object to provide a projector which can miniaturize the size of the optical unit when employing a liquid crystal panel with the aspect ratio of 16:9, etc. (a wide panel) as well as satisfy variation of dispositions.

The above object can be attained by provide a projector which has an optical system including a light source, color-separation mirrors for color-separating light from the light source into a plurality of color lights, a plurality of modulation means for modulating the respective color lights color-separated by the color-separation mirrors, a prism for compositing the color lights modulated by the modulation means, and a projection means for projecting light composited by the prism. Each of the modulation means employed by the projector is formed substantially in the shape of a rectangle with its aspect ratio set to be n:1 (n≧1.6), and the short sides of the modulation means are so disposed as to be substantially parallel with a plane including principal lights of the respective color lights to be composited by the prism.

In the projector according to the present invention, transmission cables for driving the modulation means are drawn out from the short sides of the modulation means.

The projector according to the present invention has a cooling fan for cooling down at least the modulation means, wherein the cooling fan is disposed such that the direction of cooling air is approximately parallel with long sides of the modulation means.

These objects and other objects, features and advantages of the present invention will become more apparent from the following detailed description of the preferred embodiments of the present invention.

BRIEF DESCRIPTION OF THE DRAWINGS

FIG. 1A and FIG. 1B show perspective views of conventional projectors, in which FIG. 1A shows a horizontal type projector and FIG. 1B shows a vertical type projector.

FIG. 3A to FIG. 3C show a conventional horizontal type optical unit, in which FIG. 3A shows an internal optical system of a horizontal type, FIG. 3B shows the state where the long side of a liquid crystal panel is so disposed as to be substantially parallel with a plane including principal lights of respective color lights to be composited by a prism, and FIG. 3C shows the state where shading occurs in the long side direction of a projected image.

FIG. 4A to FIG. 4C shows a vertical type optical unit according to the present invention, in which FIG. 4A shows an internal optical system of a vertical type, FIG. 4B shows the state where the short side of a liquid crystal panel is so disposed as to be substantially parallel with a plane including principal lights of respective color lights to be composited by a prism, and FIG. 4C shows the state where shading occurs in the short side direction of a projected image.

FIG. 7 shows internal wires of a conventional liquid crystal panel.

BEST MODE FOR CARRYING OUT THE INVENTION

The present invention will further be described below concerning the best modes with reference to the accompanying drawings.

In this embodiment, the present invention is applied to a projector using a liquid crystal panel with its aspect ratio set to be 16:9, etc. (a wide panel). Note that, in the following explanation, a wide panel is a liquid crystal panel with the aspect ratio of n:1 (n≧1.6), for example 16:10, 16:9, 2.33:1, being elongated along the horizontal direction as compared with a liquid crystal panel suitable for data projection with the aspect ratio of 4:3.

Figure 1B:
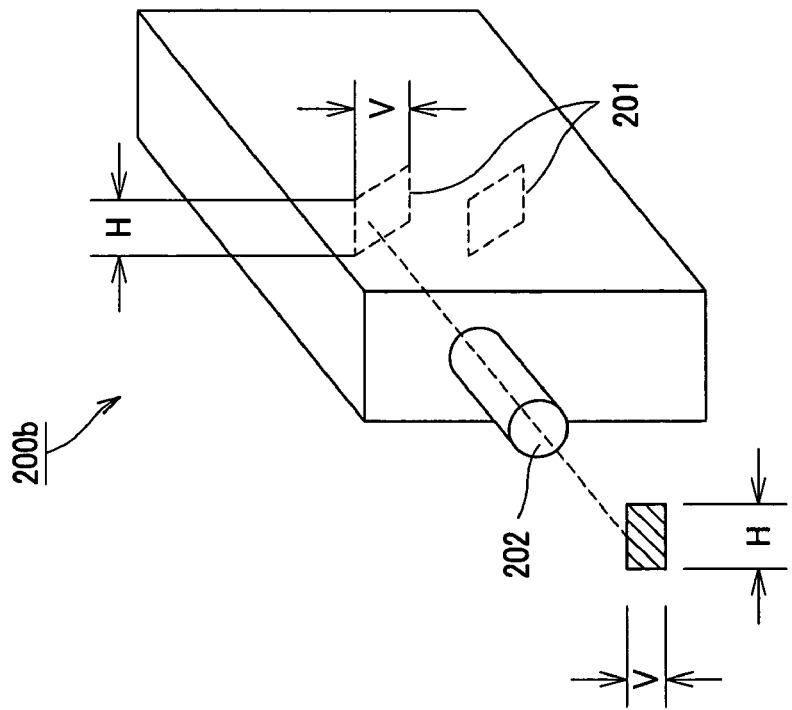
Figure 1A:
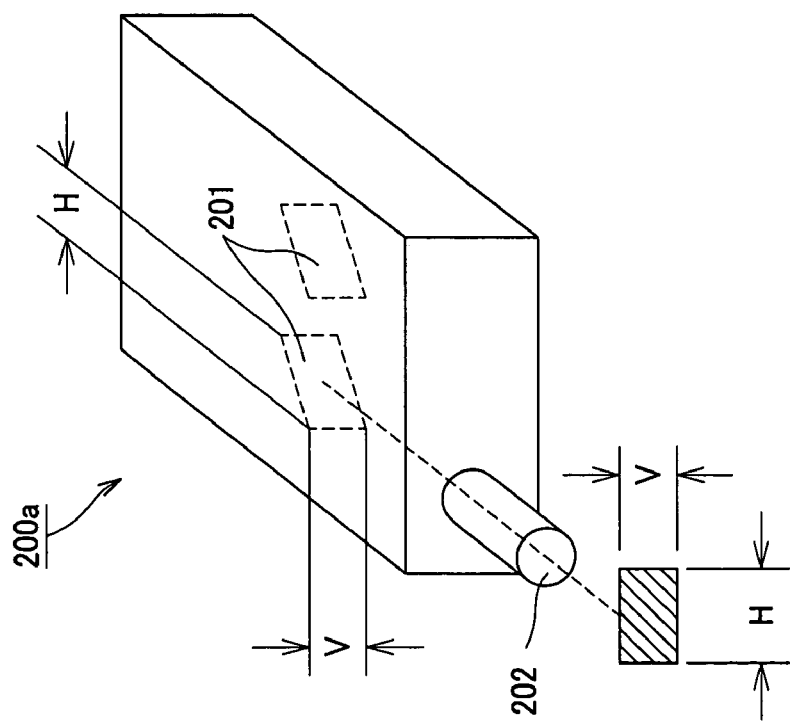
Figure 2:
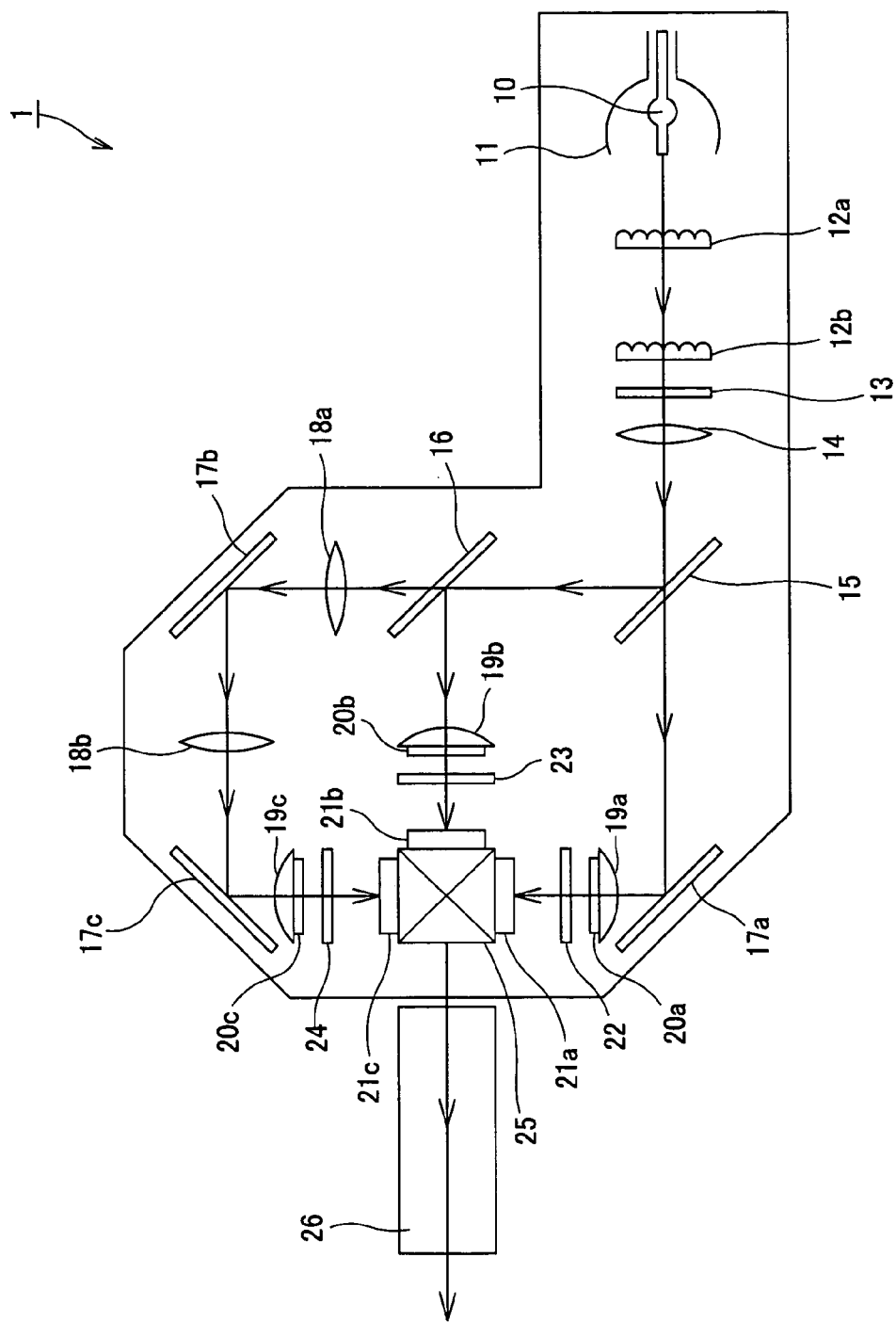
FIG. 2 shows a side view of an example of a vertical type optical unit of a projector employing transmission type liquid crystal panels.

FIG. 2 shows an example of an optical unit of a projector using a typical transmission type liquid crystal panel. In an optical unit 1 shown in FIG. 2, illumination light emitted from a lamp 10 is reflected by a reflector (reflecting plate) 11 to outgo forward. The outgoing light is equalized by fly-eye integrator lenses 12a, 12b, and has its polarization direction aligned by a PS converter 13. The illumination light which is equalized and whose polarization direction is aligned, is condensed by a main condenser lens 14 to be directed toward liquid crystal panels.

Then, the white illumination light is color-separated into blue light in transmission direction and yellow light in reflection direction by a dichroic mirror 15. The yellow light is further color-separated into green light in reflection direction and red light in transmission direction by a dichroic mirror 16. In this way, the white illumination light is color-separated into three primary colors of blue color (B), green color (G) and red color (R).

The blue illumination light is reflected by a reflecting mirror 17a and condensed by a condenser lens 19a to illuminate a liquid crystal panel 22 for blue color. The liquid crystal panel 22 for blue color is disposed between polarizing plates 20a, 21a, keeping distance therefrom, which modulate the blue illumination light together with the liquid crystal panel 22 for blue color to form blue color component of a display image. The green illumination light is condensed by a condenser lens 19b to illuminate a liquid crystal panel 23 for green color. The liquid crystal panel 23 for green color is disposed between polarizing plates 20b, 21b, keeping distance therefrom, which modulate the green illumination light together with the liquid crystal panel 23 for green color to form green color component of a display image. Optical path differences between the red illumination light and the green illumination light as well as the red illumination light and the blue illumination light are eliminated by the relay lenses 18a and 18b respectively. The red illumination light is reflected by reflecting mirrors 17b, 17c and condensed by a condenser lens 19c to illuminate a liquid crystal panel 24 for red color. The liquid crystal panel 24 for red color is disposed between polarizing plates 20c, 21c, keeping distance therefrom, which modulate the red illumination light together with the liquid crystal panel 24 for red color to form red color component of a display image.

Then illumination lights of an image modulated by the three liquid crystal panels 22, 23 and 24 are composited by a cross prism 25 to be restored to white color light and projected by a projection lens 26.

Color disposition of the liquid crystal panels 22, 23 and 24 in the optical unit 1 is not restricted to the above-described embodiment, and may be changed by interchanging the disposition of the dichroic mirrors 15, 16. In the above explanation, an illumination optical system is described, for the sake of convenience, on the other hand, configuration of an illumination optical system is not limited to the example shown in FIG. 2.

Figure 3A:
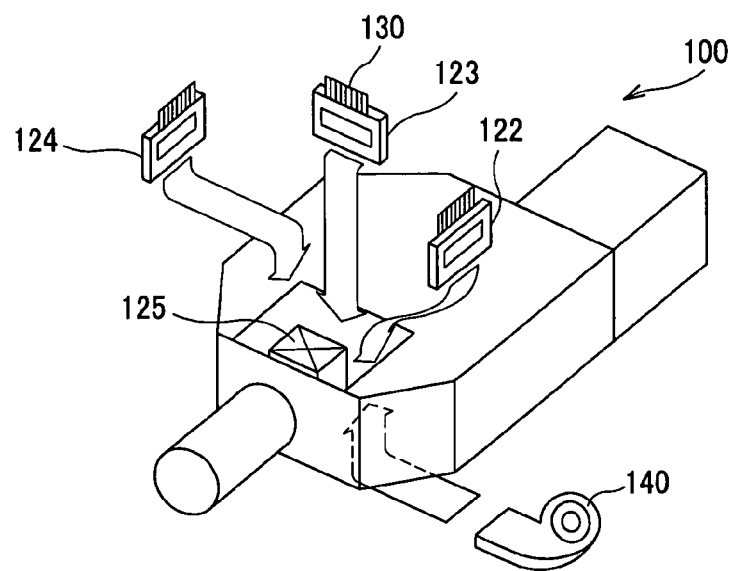
Figure 3B:
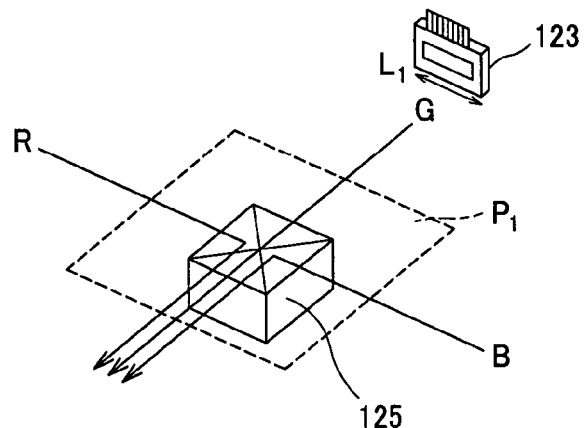

Generally, an optical unit 100 of a conventional projector is so disposed as to be parallel with the ground such that an internal optical system becomes of the horizontal type, as shown in FIG. 3A. In this case, a plane $P_1$ including principal lights R, G and B of the respective primary colors to be composited by a cross prism 125 and long side $L_1$ of a liquid crystal panel 123 are so disposed as to be substantially parallel with each other, as shown in FIG. 3B. With respect to liquid crystal panels 122, 124, the long sides of the liquid crystal panels and the plane $P_1$ including principal lights R, G and B of the respective primary colors to be composited by the cross prism 125 are so disposed as to be substantially parallel with each other, which state is not shown. Note that the cross section size of the cross prism 125 and the size of a projection optical system are determined according to the length of long sides of the liquid crystal panels 122, 123 and 124.

Figure 4A:
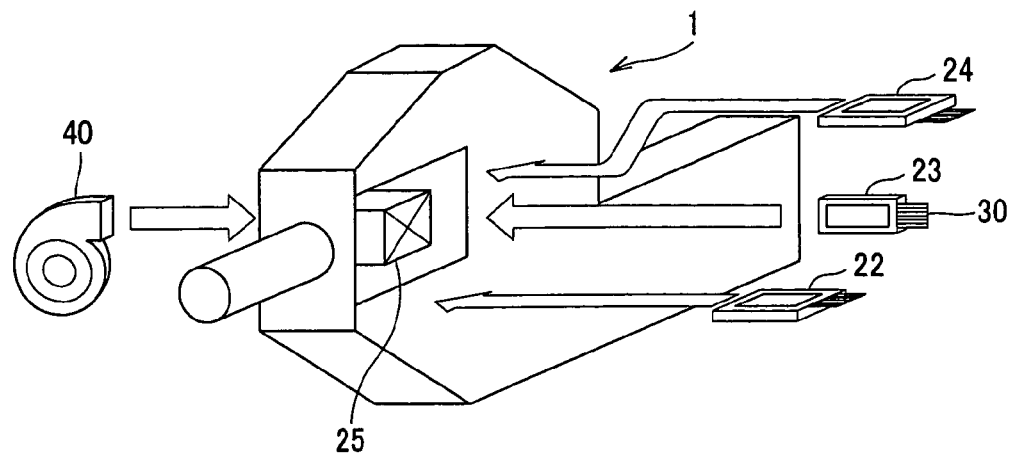
Figure 4B:
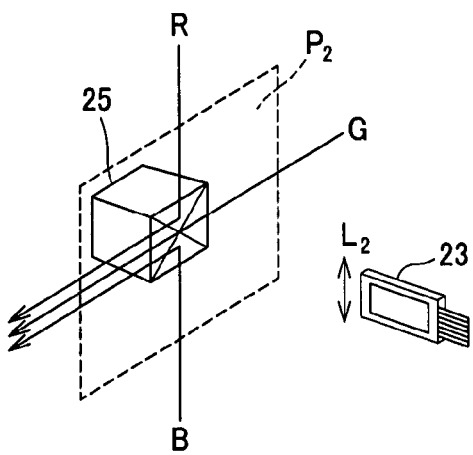

On the other hand, the optical unit 1 according to the present invention is so disposed as to be perpendicular to the ground such that an internal optical system becomes of the vertical type, as shown in FIG. 4A. In this case, a plane $P_2$ including principal lights R, G, and B of the respective primary colors to be composited by a cross prism 25 and short side $L_2$ of a liquid crystal panel 23 are so disposed as to be substantially parallel with each other, as shown in FIG. 4B. With respect to liquid crystal panels 22, 24, the short sides of the liquid crystal panels and the plane including principal lights R, G and B of the respective primary colors to be composited by the cross prism 25 are so disposed as to be substantially parallel with each other, which state is not shown. Note that the cross section size of the cross prism 25 and the size of a projection optical system are determined according to the length of short sides of the liquid crystal panels 22, 23 and 24.

Figure 3C:
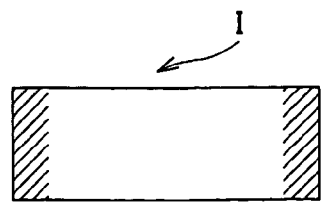
Figure 4C:
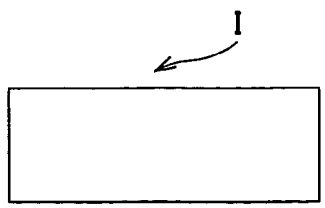

Comparing FIG. 3 with FIG. 4, it is obvious that the configuration on the basis of the short sides of the liquid crystal panels 22, 23 and 24 shown in FIG. 4 can make the size of an optical system smaller. This advantage increases when a wide panel having large difference between the length of the long side $L_1$ and that of the short side $L_2$ is used.

For example, when comparing liquid crystal panels of 0.7 type, a liquid crystal panel with the aspect ratio of 4:3 has the long side of 14.3 mm and the short side of 10.8 mm. On the other hand, a liquid crystal panel with the aspect ratio of 16:9 has the long side of 15.4 mm and the short side of 8.6 mm. In this case, when the internal optical system is of the horizontal type, as shown in FIG. 3, since the size of the optical system is determined according to the length of long sides of the liquid crystal panels 122, 123 and 124, the size of the optical system employing the wide liquid crystal panel of 0.7 type with the aspect ratio of 16:9 having the long side of 15.4 mm becomes somewhat larger than that of the optical system employing the liquid crystal panel of 0.7 type with the aspect ratio of 4:3 having the long side of 14.3 mm.

On the contrary, when the internal optical system is of the vertical type, as shown in FIG. 4, since the size of the optical system is determined according to the length of short sides of the liquid crystal panels 22, 23 and 24, the size of the optical system employing the wide liquid crystal panel of 0.7 type with the aspect ratio of 16:9 having the short side of 8.6 mm becomes smaller than that of the optical system employing the liquid crystal panel of 0.7 type with the aspect ratio of 4:3 having the short side of 10.8 mm. Specifically, when compared with the horizontal type optical system shown in FIG. 3, the vertical type optical system can be miniaturized or reduced to approximately a half in length, to approximately a quarter in area, and to approximately one eighth in volume.

Namely, in the case of a liquid crystal panel with the aspect ratio of 16:9, when the horizontal type optical system is employed, the size of the optical system can be reduced, which can increase advantages. When the optical system is miniaturized, all the optical parts included in the optical system can be also miniaturized, thus it becomes possible to significantly reduce the cost as a whole. In particular, with respect to a projection lens, the size of the image circle and the length of back focus can be reduced to make the lens significantly miniaturized, increasing advantages.

Figure 5:
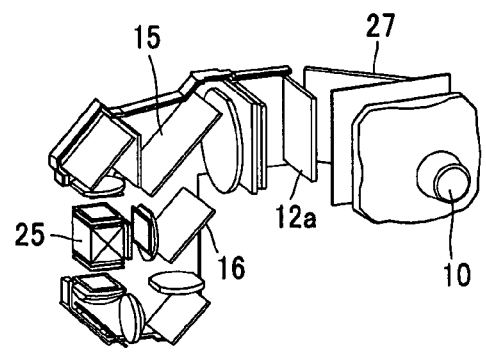
FIG. 5 shows a perspective view of an example of an optical unit which makes the length of depth direction short.
Figure 6A:
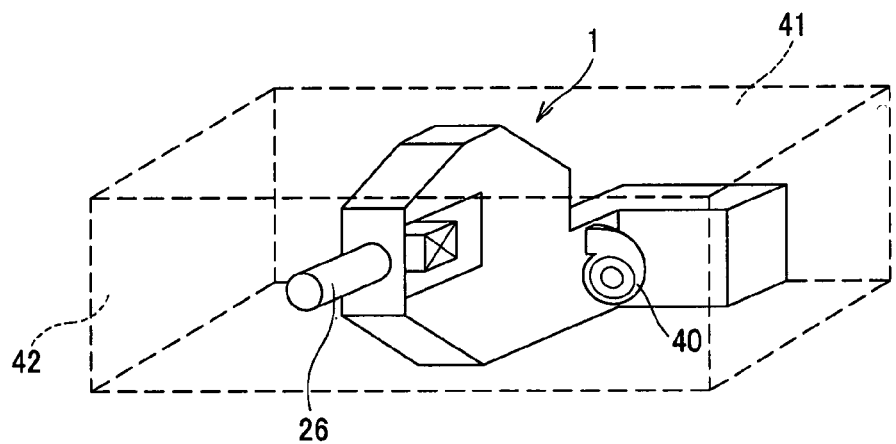
FIG. 6A shows a perspective view of the state where an optical unit and a cooling fan are housed in a horizontal type housing.

As described above, according to the present invention, the plane including the principal lights R, G and B of the respective primary colors to be composited by the cross prism 25 and the short sides of the crystal liquid panels 22, 23 and 24 are so disposed as to be substantially parallel with each other, so that the size of the optical unit 1 can be significantly miniaturized as compared with that of a conventional one. Meanwhile, to make the depth length of the optical unit 1 short, a reflecting mirror 27 may be used to change the direction of the illumination light emitted from the lamp 10 by 90°, as shown in a perspective view of FIG. 5. By thus miniaturizing the optical unit 1, the vertical type optical system can be housed in a horizontal type housing, which forms the same shape of a conventional horizontal type housing such that width along the horizontal direction of the front surface 42 provided a projection lens 26 is longer than height along the vertical direction thereof, as shown in FIG. 6A. Thus, the variation of dispositions, such as hanging from a ceiling and placing on a floor can be realized. So as to house a vertical optical system in the horizontal type housing 41 whose height is substantially equal to that of the conventional horizontal type projector, it is preferable that, when a liquid crystal panel with the aspect ratio of 16:9 is used, the 0.7 type panel whose diagonal line is equal to or shorter than 0.7 inch is used. With respect to other wide panels, it is preferable that the short side length is equal to or shorter than that of the 0.7 type liquid crystal panel with the aspect ratio of 16:9.

In the horizontal type optical unit 100 shown in FIG. 3A, harnesses and transmission cables 130 such as flat cables, etc. are drawn out from the long sides of the liquid crystal panels 122, 123 and 124, on the other hand, in the vertical type optical unit 1 according to the present invention, transmission cables 30 are drawn out from the short sides of the liquid crystal panels 22, 23 and 24. That is, on the conventional liquid crystal panel, as shown in FIG. 7, a Pre-charge drive circuit 132, vertical shift register circuits 133a, 133b, a horizontal shift register circuit 134, and a horizontal/vertical level shifter 135 are provided around an effective area 131 which is actually illuminated by illumination light, and wires from the horizontal shift register circuit 134 and the horizontal/vertical level shifter 135 are connected to an electrode 136 provided on the long side of the liquid crystal panel.

Figure 8:
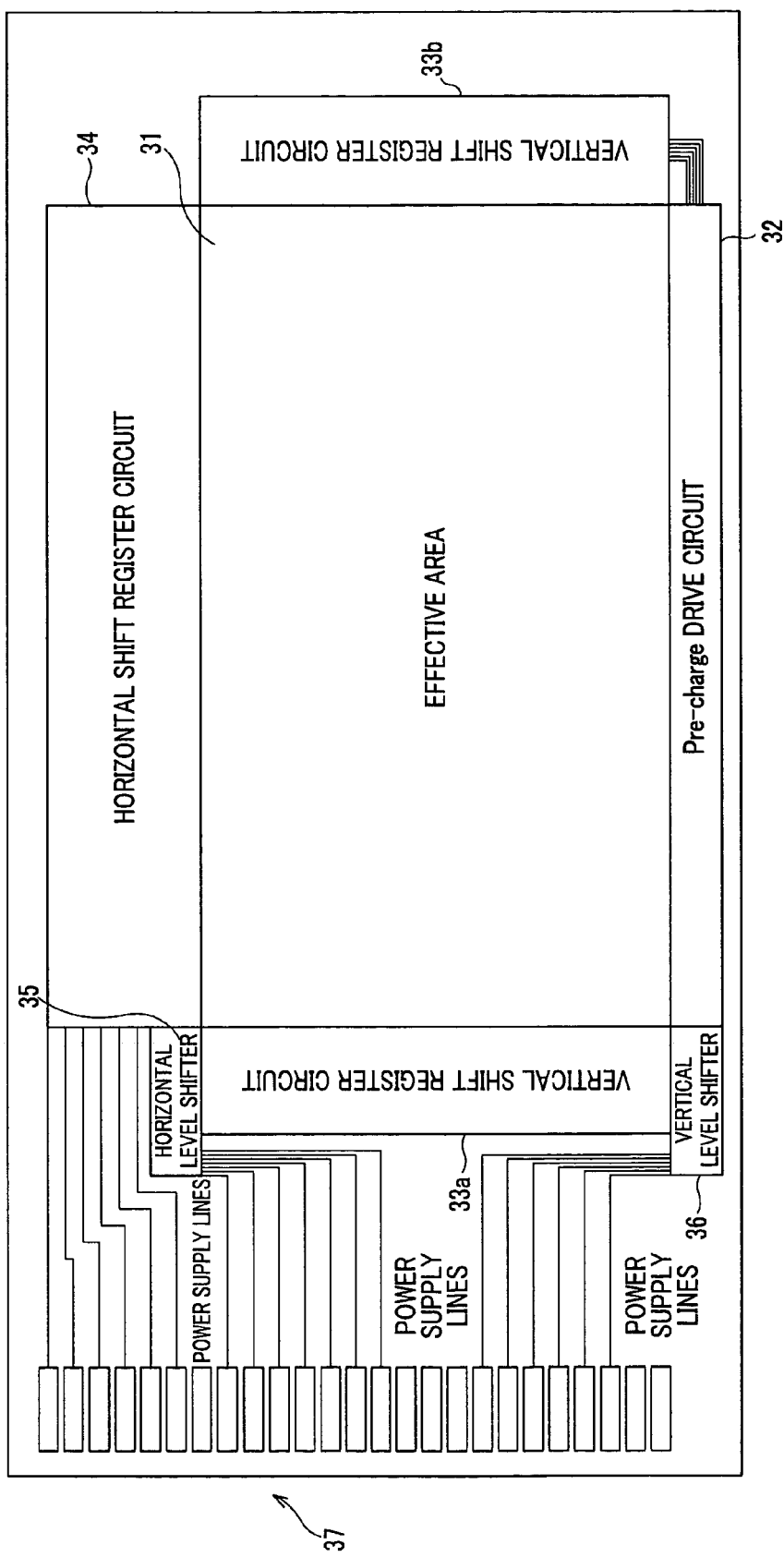
FIG. 8 shows internal wires of a liquid crystal panel according to the present invention.

On the contrary, on the liquid crystal panel according to the present invention, as shown in FIG. 8, a Pre-charge drive circuit 32, vertical shift register circuits 33a, 33b, a horizontal shift register circuit 34, a horizontal level shifter 35, and vertical level shifter 36 are provided around an effective area 31, and wires from the horizontal shift register circuit 34, the horizontal level shifter 35 and the vertical level shifter 36 are connected to an electrode 37 provided on the short side of the liquid crystal panel.

As described above, in the present invention, being drawn out from the short sides of the liquid crystal panels 22, 23 and 24, the transmission cables 30 can be easily directed. Furthermore, by disposing the electrode 37 for the transmission cables 30 on the short side of the liquid crystal panel, the short side circuit area which is necessary around the effective area becomes small, thereby the short side length of the liquid crystal panels 22, 23 and 24 can be short, further miniaturizing the size of the optical unit 1.

When the horizontal type housing 41 whose height is substantially equal to that of the conventional horizontal type projector is realized by using the vertical type optical system described above, since an internal optical system is of the vertical type, the space which has been filled by the conventional horizontal type optical system can be utilized for other necessary mechanisms and circuits.

In the horizontal type optical unit, a cooling fan 140 is generally disposed in a manner shown in FIG. 3A, so as to keep the optical system low. However, in this case, it is necessary to change the direction of cooling air by 90° before the cooling air reaches around the liquid crystal panels 122, 123 and 124 to be cooled down. On the other hand, in the vertical type optical unit according to the present invention, as shown in FIG. 4A, disposing a cooling fan 40 beside the optical system has no influence on the height of the optical system. Therefore, cooling air can be directed around the liquid crystal panels 22, 23 and 24 to be cooled down without changing the direction thereof steeply, thus the cooling efficiency is improved. In the example, the cooling fan 40 sends cooling air between the polarizing plates 20a, 21a which sandwich the liquid crystal panel 22, keeping distance therefrom, so that both surfaces of the liquid crystal panel 22 and at least one surfaces of the polarizing plates 20a, 21a are efficiently cooled down. Furthermore, the path of cooling air can be formed at one side of the liquid crystal panel 22. The cooling air works for other liquid crystal panels 23, 24 and polarizing plates 20b, 21b and 20c, 21c in the same way.

Figure 6B:
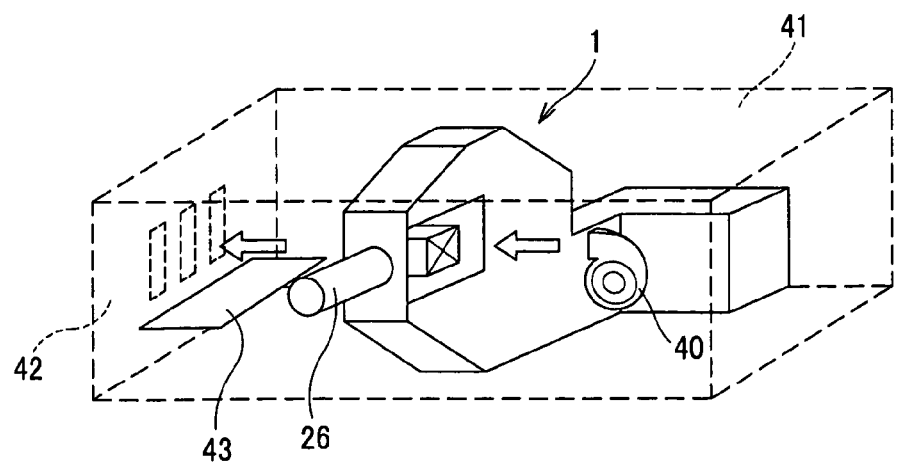
FIG. 6B shows the path of cooling air sent from the cooling fan.

Furthermore, the cooling fan 40 efficiently cools down not only around the liquid crystal panels 22, 23 and 24 but also a circuit board 43, which has circuit parts being heat-emitting sources necessary to be cooled down and is disposed along the linear path of cooling air sent from the cooling fan 40 simultaneously, as shown in FIG. 6B.

Meanwhile, in the optical unit 1 shown in FIG. 2, the image I projected on a screen often has shading on both ends of sides parallel with the plane including principal lights of the respective primary colors to be composited by the cross prism 25, due to the difference of angle distribution of the illumination light coming into the dichroic mirrors 15, 16. That is, in the horizontal type optical unit shown in FIG. 3, shading often occurs in the long side direction of the liquid crystal panels 122, 123 and 124, on the other hand, in the vertical type optical unit shown in FIG. 4, shading often occurs in the short side direction of the liquid crystal panels 22, 23 and 24. Here, in the optical unit 100 shown in FIG. 3, which is configured on the basis of the long side, since shading occurs in the long side direction (right-and-left direction), the length of which is long, the shading is highly visible. On the other hand, in the optical unit 1 according to the present invention, since shading occurs in the short side direction (up-and-down direction), the length of which is short, the shading is almost invisible.

While the invention has been described in accordance with certain preferred embodiments thereof illustrated in the accompanying drawings and described in the above description in detail, it should be understood by those ordinarily skilled in the art that the invention is not limited to the embodiments, but various modifications, alternative configurations or equivalents can be implemented without departing from the scope and spirit of the present invention as set forth and defined by the appended claims.

Figure 9:
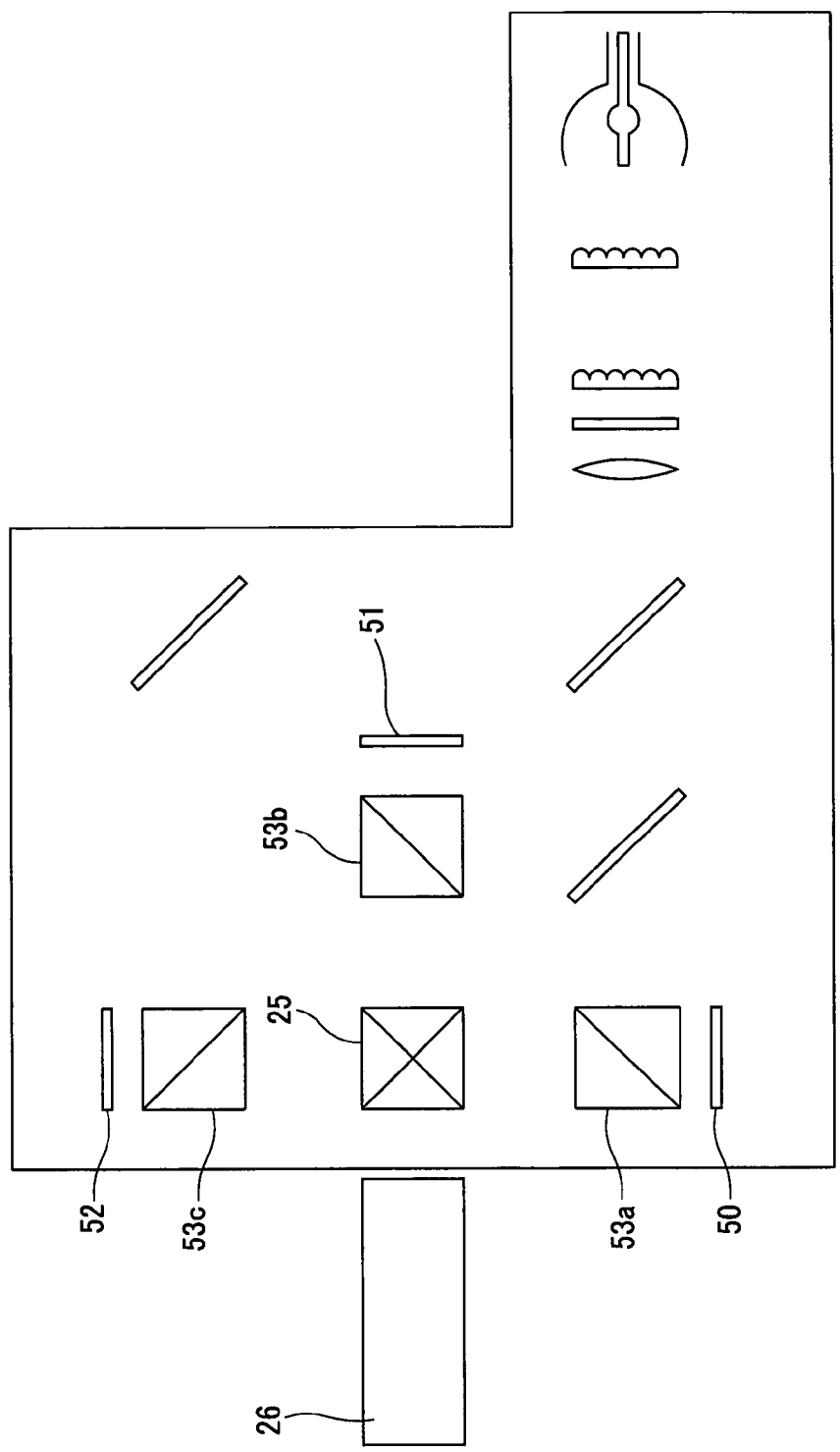
FIG. 9 shows a side view of another example of an optical unit according to the present invention.

For example, the embodiment described above employs transmission type liquid crystal panel. On the other hand, the present invention is not restricted to this, and reflection type liquid crystal panels 50, 51 and 52 can be employed, as shown in FIG. 9. In this case, since the liquid crystal panels are of the reflection type, PBS prisms 53*a*, 53*b* and 53*c* are used instead of the polarizing plates 21*a*, 21*b* and 21*c* shown in FIG. 2.

Figure 10:
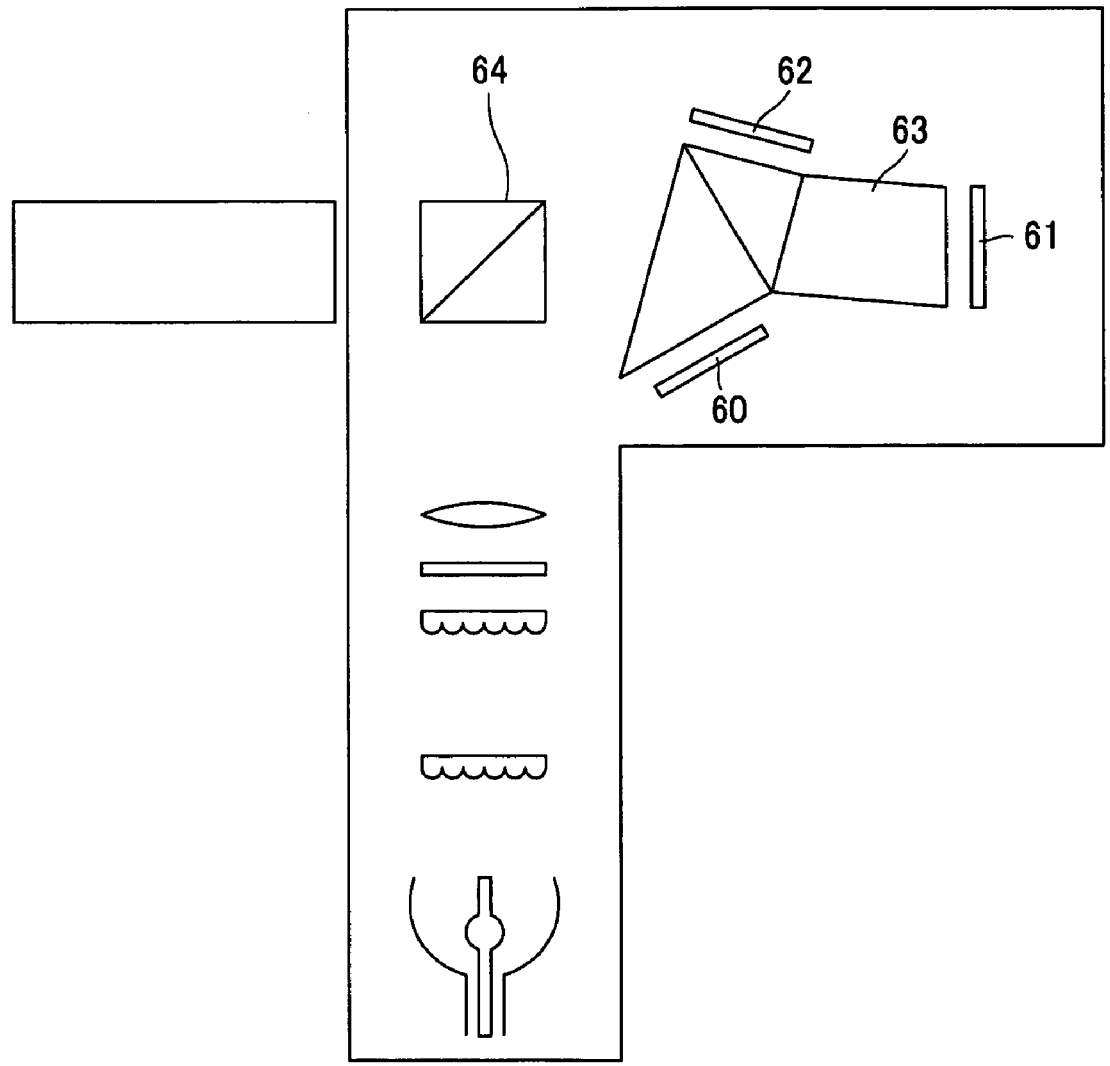
FIG. 10 shows a side view of yet another example of an optical unit according to the present invention.

Furthermore, as shown in FIG. 10, instead of the cross prism 25, a Phillips type prism 63 can be used. In case of using reflection type liquid crystal panels 60, 61 and 62, the optical unit can be configured with a PBS prism 64, as shown in FIG. 10.

INDUSTRIAL APPLICABILITY

As described above, in the projector according to the present invention, by disposing modulation means such that the short sides thereof are substantially parallel with a plane including principal lights of the respective primary colors to be composited by the cross prism, shading which occurs on a projected image becomes almost invisible, and in addition, the size of an optical unit can be significantly small as compared with a conventional one. Thus, it becomes possible to miniaturize a projector as a whole. Meanwhile, since transmission cables are drawn out from the short sides of the modulation means, the transmission cables can be easily directed. Furthermore, by disposing a cooling fan such that the direction of the cooling air sent from the cooling fan is approximately parallel with the long sides of the modulation means, cooling efficiency can be improved.

The invention claimed is:

1. A projector having an optical system comprising:
   a light source,
   color-separation mirrors for color-separating light from the light source into a plurality of color light beams,
   a plurality of modulation means for modulating the respective color light beams color-separated by the color-separation mirrors,
   a prism for compositing the color light beams modulated by the modulation means,
   a projection means for projecting light composited by the prism,
   a cooling fan for cooling at least the modulation means, wherein the cooling fan is disposed such that a direction of cooling air is approximately parallel with long sides of the modulation means, and
   a circuit board disposed along a linear path of cooling air sent from the cooling fan, whereby the cooling fan cools the circuit board as well as the modulation means,
   wherein each of the modulation means is formed substantially in the shape of a rectangle with its aspect ratio set to be n:1 (n>1.6), and short sides of the modulation means are disposed to be substantially parallel with a plane including principal light beams of the respective color light beams to be composited by the prism.

2. The projector according to claim 1, further comprising transmission cables for driving the modulation means arranged to be drawn out from the short sides of the modulation means.

3. The projector according to claim 1, wherein each of the plurality of modulation means comprises a liquid crystal panel and polarization plates that are so disposed as to sandwich the liquid crystal panel while keeping a distance therefrom, wherein the cooling fan sends cooling air between the liquid crystal panels and respective polarization plates to cool the modulation means.

4. The projector according to claim 1, further comprising a housing wherein the optical system is housed, wherein the housing is formed such that a width along a horizontal direction of a front surface provided for the projection means is longer than a height along a vertical direction thereof.

5. The projector according to claim 1, wherein a diagonal line of an effective area of each of the plurality of modulation means is equal to or shorter than 0.7 inches.

* * * * *